United States Patent
Alva et al.

(10) Patent No.: US 10,432,418 B1
(45) Date of Patent: Oct. 1, 2019

(54) INTEGRATING COGNITIVE TECHNOLOGY WITH SOCIAL NETWORKS TO IDENTIFY AND AUTHENTICATE USERS IN SMART DEVICE SYSTEMS

(71) Applicant: International Business Machines Corporation, Armonk, NY (US)

(72) Inventors: Jesus Alva, Cedar Park, TX (US); Leigh Williamson, Austin, TX (US); Ricardo Olivieri, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/035,146

(22) Filed: Jul. 13, 2018

(51) Int. Cl.
| | |
|---|---|
| H04L 12/28 | (2006.01) |
| H04L 29/08 | (2006.01) |
| G06F 21/31 | (2013.01) |
| G06F 17/28 | (2006.01) |
| G05B 19/418 | (2006.01) |
| G06F 17/27 | (2006.01) |
| G06Q 50/00 | (2012.01) |

(52) U.S. Cl.
CPC ........ *H04L 12/2803* (2013.01); *G05B 19/418* (2013.01); *G06F 17/2785* (2013.01); *G06F 17/28* (2013.01); *G06F 21/31* (2013.01); *H04L 67/306* (2013.01); *G05B 2219/2642* (2013.01); *G06Q 50/01* (2013.01)

(58) Field of Classification Search
None
See application file for complete search history.

(56) References Cited

U.S. PATENT DOCUMENTS

| | | | | |
|---|---|---|---|---|
| 9,300,925 | B1* | 3/2016 | Zhang | H04N 7/181 |
| 9,817,872 | B2* | 11/2017 | Pamu | G06F 16/2458 |
| 2007/0282778 | A1* | 12/2007 | Chan | G06N 5/02 |
| | | | | 706/48 |
| 2010/0121849 | A1* | 5/2010 | Goeldi | G06Q 10/00 |
| | | | | 707/736 |
| 2011/0211737 | A1* | 9/2011 | Krupka | G06F 16/58 |
| | | | | 382/118 |
| 2014/0196104 | A1* | 7/2014 | Chari | H04L 63/20 |
| | | | | 726/1 |
| 2015/0061825 | A1* | 3/2015 | Suzuki | H04W 4/21 |
| | | | | 340/5.52 |
| 2015/0061859 | A1 | 3/2015 | Matsuoka et al. | |

(Continued)

FOREIGN PATENT DOCUMENTS

WO 2016141199 A1 9/2016

OTHER PUBLICATIONS

Breslin et al., "Integrating Social Networks and Sensor Networks", w3.org/2008/09/msnws/papers/sensors.html, Jan. 15-16, 2009, 7 pages.

(Continued)

*Primary Examiner* — Carlos Garcia
(74) *Attorney, Agent, or Firm* — Jordan IP Law, LLC

(57) ABSTRACT

Methods and systems may provide for technology to extract relationship data from one or more social networks and generate a trust network based on the relationship data, wherein the trust network identifies one or more trusted individuals. The technology also grants access to the smart device system with respect to the one or more trusted individuals.

19 Claims, 4 Drawing Sheets

(56) References Cited

U.S. PATENT DOCUMENTS

| | | | | |
|---|---|---|---|---|
| 2015/0319102 A1* | 11/2015 | Esdaile | ............... | H04W 4/21 |
| | | | | 709/225 |
| 2018/0025374 A1* | 1/2018 | Ghosh | ............... | G06Q 30/0208 |
| | | | | 705/7.15 |
| 2018/0061159 A1* | 3/2018 | Saso | ............... | G07C 9/00158 |

OTHER PUBLICATIONS

Choi et al., "An Analysis on Device Sociality: Deriving Human Social Relationships from Device Interactions", Int. J. Advance Soft Compu. Appl, vol. 6, No. 3, Nov. 2014, 16 pages.

Gallacher et al., "Intelligent Systems that Combine Pervasive Computing and Social Networking", 9th International Conference on Ubiquitous Intelligence and Computing and 9th International Conference on Autonomic and Trusted Computing, 2012, 8 pages.

Kamilaris et al., "Social Networking of the Smart Home", IEEE Xplore, Oct. 2010, 7 pages.

Wich et al., "Enrichment of Smart Home Services by Integrating Social Network Services and Big Data Analytics", 49th Hawaii International Conference on System Sciences, 2016, 10 pages.

"The Neo4j Native Graph Platform", neo4j.com, 2018, 2 pages.

* cited by examiner

INTEGRATING COGNITIVE TECHNOLOGY WITH SOCIAL NETWORKS TO IDENTIFY AND AUTHENTICATE USERS IN SMART DEVICE SYSTEMS

BACKGROUND

Embodiments generally relate to security in smart device systems. More particularly, embodiments relate to integrating cognitive services with social networks to identify and authenticate users in smart device systems.

Smart homes provide homeowners with remote control over household appliances, locks, thermostats, lights, and so forth. To enforce security, smart homes may designate a primary user (e.g., the homeowner), where the addition of users and the assignment of their access permissions may be manual, complex and time consuming. Accordingly, a sub-optimal user experience often results.

BRIEF SUMMARY

Embodiments include a computing device comprising network interface circuitry to receive one or more media feeds associated with one or more social networks, one or more processors, and a computer readable storage medium having program instructions embodied therewith, the program instructions executable by the one or more processors to cause the computing device to conduct an automatic cognitive analysis of the one or more media feeds, determine relationship data based on the automatic cognitive analysis, generate a trust network based on the relationship data, wherein the trust network identifies one or more trusted individuals, grant access to a smart device system with respect to the one or more trusted individuals, identify a change in the relationship data, revoke access to the smart device system with respect to at least one of the one or more trusted individuals if the change satisfies a first condition, and grant access to the smart device system with respect to a new individual if the change satisfies a second condition.

Embodiments also include a method comprising conducting an automatic cognitive analysis of one or more media feeds associated with one or more social networks, determining relationship data based on the automatic cognitive analysis, generating a trust network based on the relationship data, wherein the trust network identifies one or more trusted individuals and includes one or more graphs, granting access to a smart device system with respect to the one or more trusted individuals, identifying a change in the relationship data, revoking access to the smart device system with respect to a new individual if the change satisfies a first condition, and granting access to the smart device system with respect to a new individual if the change satisfies a second condition.

Embodiments also include a computer program product to manage access to a smart device system, the computer program product comprising a computer readable storage medium having program instructions embodied therewith, the program instructions executable by a computing device to cause the computing device to extract relationship data from one or more social networks, generate a trust network based on the relationship data, wherein the trust network identifies one or more trusted individuals, and grant access to the smart device system with respect to the one or more trusted individuals.

BRIEF DESCRIPTION OF THE SEVERAL VIEWS OF THE DRAWINGS

The various advantages of the embodiments of the present invention will become apparent to one skilled in the art by reading the following specification and appended claims, and by referencing the following drawings, in which:

DETAILED DESCRIPTION

Figure 1:
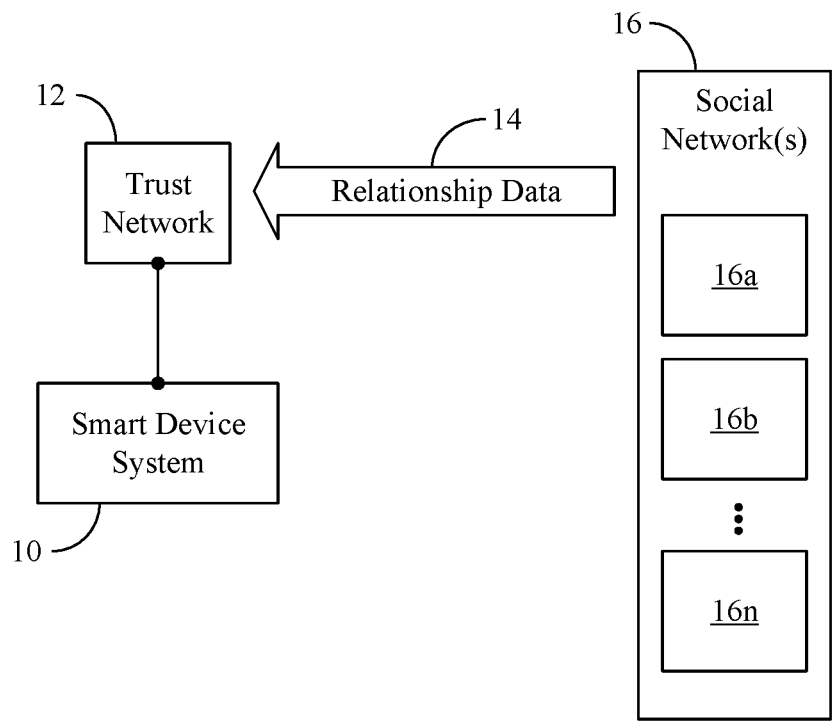
FIG. 1 is a block diagram of an example of the construction of a trust network based on social network relationship data according to an embodiment.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Turning now to FIG. 1, a smart device system 10 is shown. In an embodiment, the smart device system 10 includes actuators, sensors, appliances, locks, thermostats, lights, etc. (e.g., Internet of Things/IoT devices), that are remotely monitored and/or controlled. In one example, the smart device system 10 is installed in a smart home and/or living environment. In another example, the smart device system 10 is installed in a commercial and/or enterprise setting (e.g., secure laboratory). As will be discussed in greater detail, a trust network 12 may identify one or more trusted individuals, where the trusted individual(s) are granted access to the smart device system 10. In the illustrated example, the trust network 12 is automatically generated based on relationship data 14 that is extracted from one or more social networks 16 (16a-16n). In an embodiment, the relationship data 14 is identified with respect to a primary user of the social network(s) 16, where the primary user is also the primary user of the smart device system 10. Thus, the primary user may be a homeowner, laboratory manager, and so forth, depending on the circumstances. The illustrated social network(s) 16 are therefore used as a driver/trigger to create and maintain secure access to the smart device system 10.

For example, if the smart device system 10 is installed in a smart home, the social network(s) 16 might include personal social networks. In such a case, a first social network 16a might include FACEBOOK, a second social network 16b might include TWITTER, an $n^{th}$ social network 16n may include GOOGLE PLUS, and so forth. By contrast, if the smart device system 10 is installed in an enterprise setting, the social network(s) 16 may include work-based collaboration platforms such as, for example, IBM CONNECTIONS. In an embodiment, media feeds from the social network(s) 16 include photos, connections (e.g., following connections, friendship connections), comments, instant messages (IMs), "likes," video feeds, audio feeds (e.g., podcasts), and so forth. The media feeds may also include other attributes such as employee relationships (e.g., supervisor, subordinate), skills, current roles, security clearances, etc., or any combination thereof (e.g., in work-based collaboration platforms). In one example, the media feeds are accessed (e.g., scanned/ingested) via application programming interfaces (APIs).

In an embodiment, the relationship data 14 is determined based on an automatic cognitive analysis (e.g., image recognition, face recognition, natural language and/or other cognitive service/technology) of the media feeds from the social network(s) 16. In one example, image/face recognition analysis automatically identifies the spouse, children and/or parents of the primary user, where those individuals are added to the trust network 12 either automatically or upon approval by the primary user. In another example, a previously trusted individual is removed from the trust network 12 when natural language analysis of remarks exchanged between the primary user and the previously trusted individual indicates that a negative tone and/or mood change has taken place between the two individuals. In still another example, if image/face recognition analysis indicates that a previously trusted individual is either appearing less frequently on a social networking page of the primary user or frowning in photos posted on a social networking page of the primary user, a removal of the previously trusted individual from the trust network 12 is either automatically conducted or suggested to the primary user. Other examples may also be implemented.

Automatically generating and maintaining the trust network 12 based on the relationship data 14 extracted from the social network(s) 16 provides a number of significant advantages. For example, reducing and/or eliminating the manual entry of trusted individuals and their respective permissions into the trust network 12 reduces complexity (e.g., cost/time), improves security and enhances the user experience. Moreover, automatically generating and maintaining the trust network 12 enables the detection of trust changes that might otherwise be overlooked by the primary user. For example, the aforementioned examples of a change in tone, mode and/or interaction frequency might be subtle yet worthy of a change in the trust network 12. Indeed, two individuals may remain connected in a social medium while the level of trust between them deteriorates. In such a case, the illustrated solution improves security by closely tailoring the permissions of the smart device system 10 to the relationships maintained by the primary user of the smart device system 10.

Figure 2:
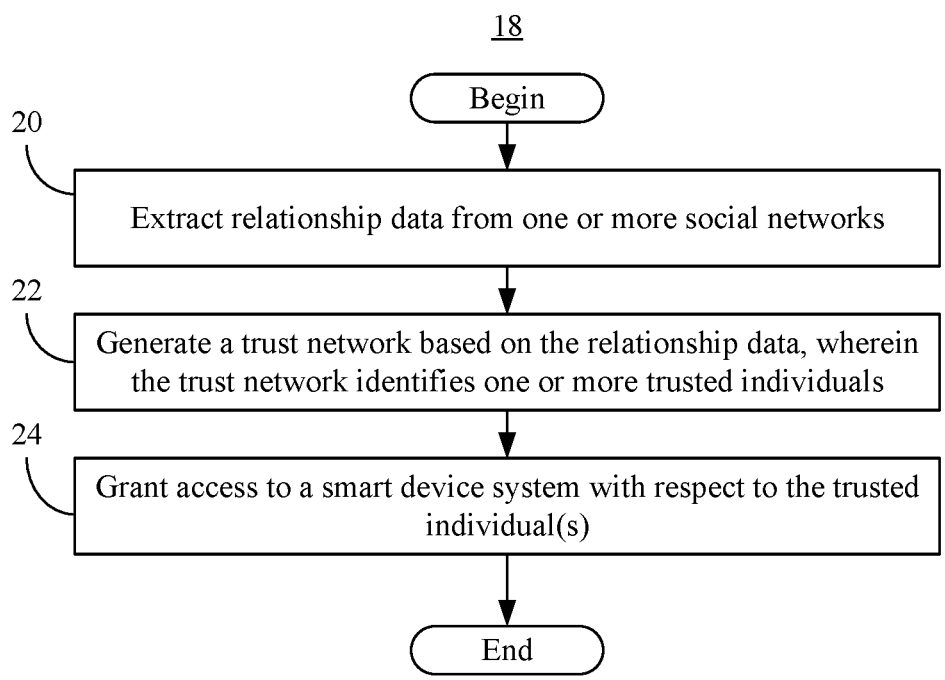
FIG. 2 is a flowchart of an example of a method of managing access to a smart device system according to an embodiment.

FIG. 2 shows a method 18 of managing access to a smart device system such as, for example, the smart device system 10 (FIG. 1), already discussed. In an embodiment, the method 18 is implemented in fixed-functionality hardware, configurable logic, logic instructions, etc., or any combination thereof. For example, the logic instructions might include assembler instructions, ISA instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 20 provides for extracting relationship data from one or more social networks. In an embodiment, block 20 includes conducting an automatic cognitive analysis of one or more media feeds associated with the social network(s) and determining the relationship data based on the automatic cognitive analysis. In one example, the automatic cognitive analysis includes an image recognition analysis, a face recognition analysis, a natural language analysis, etc., or any combination thereof. A trust network is automatically generated at block 22, where the trust network identifies one or more trusted individuals. As will be discussed in greater detail, the trust network may include a graph of interpersonal relationships between the trusted individual(s) and a primary user of the social network(s). In an embodiment, the trust network also includes a graph of permission relationships between the trusted individual(s) and the components (e.g., actuators, sensors, appliances, locks, thermostats, lights, etc.) of the smart device system.

Block 24 grants access to the smart device system with respect to the trusted individual(s). Block 24 may include communicating and/or downloading (e.g., via wireless and/or wired link) the trust network either indirectly to a controller of the smart device system or directly to the components of the smart device system. In an embodiment, block 24 includes programming the smart device system with the identities of the trusted individual(s) as well as their respective access permissions (e.g., spouse has full access, children have access to exterior locks, etc.). In an enterprise example, a first trusted individual might be given access to both the exterior lock to a laboratory and a secure area (e.g., safe, refrigerator) within the laboratory, whereas a second trusted individual is given access only to the exterior lock. In either instance, the access decisions are driven by the relationships extracted/derived from social networks (e.g., personal social networks and/or work-based collaboration platforms).

Accordingly, when a trusted individual encounters a component of the smart device system, identification and authentication of the trusted individual can be successfully completed. For example, when in the proximity of a lock in the smart device system, the trusted individual will be identified as being part of the trusted network and given the opportunity to provide authentication input (e.g., passcode, biometric data, audio input, etc.). Similarly, when attempting to remotely access a thermostat in the smart device system, the trusted individual will be recognized as a registered user and given the opportunity to provide authentication input (e.g., user identification, password, multifactor authentication and/or other credentials).

Thus, the illustrated method 18 reduces and/or eliminates the manual entry of trusted individuals and their respective permissions, reduces cost/time, improves security and enhances the user experience. More particularly, the illustrated method 18 improves security by closely tailoring the permissions of the smart device system to the relationships maintained by the primary user.

Figure 3A:
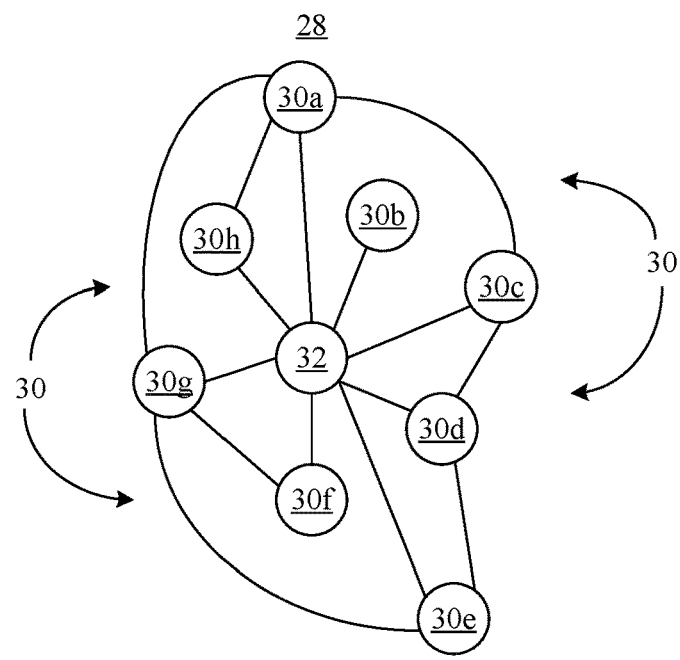
FIG. 3A is an illustration of an example of a relationship graph according to an embodiment.

FIG. 3A shows a graph 28 of relationships between a plurality of trusted individuals 30 (30a-30h) and a primary user 32 of one or more social networks. In an embodiment, the nodes of the graph 28 are connected by "edges" that indicate the existence and/or strength of the relationship between the nodes. In one example, each edge is assigned a score (not shown) that quantifies the strength of the relationship. Thus, detection of a relatively high frequency of interactions (e.g., IMs, wall posts, likes, comments) between the primary user 32 and, for example, a first trusted individual 30a automatically increases the trust score (e.g., edge strength) between the primary user 32 and the first trusted individual 30a. Similarly, detection of a relatively positive tone in the interactions between the primary user 32 and, for example, a second trusted individual 30b automatically increases the trust score between the primary user 32 and the second trusted individual 30b.

In yet another example, detection of a relatively positive mood (e.g., evidenced by smiles) in photos of the primary user 32 and a third trusted individual 30c automatically increases the trust score between the primary user 32 and the third trusted individual 30c. In an embodiment, each of these events are automatically detected via cognitive technology and mapped onto the graph 28, which is integrated into the trust network. Additionally, a graph of each of the trusted individuals 30 may be automatically generated to reflect the access privileges of the trusted individuals 30 relative to the components of the smart device system. In one example, a first privilege graph is created for the first trusted individual 30a, a second privilege graph is created for the second trusted individual 30b, and so forth.

Figure 3B:
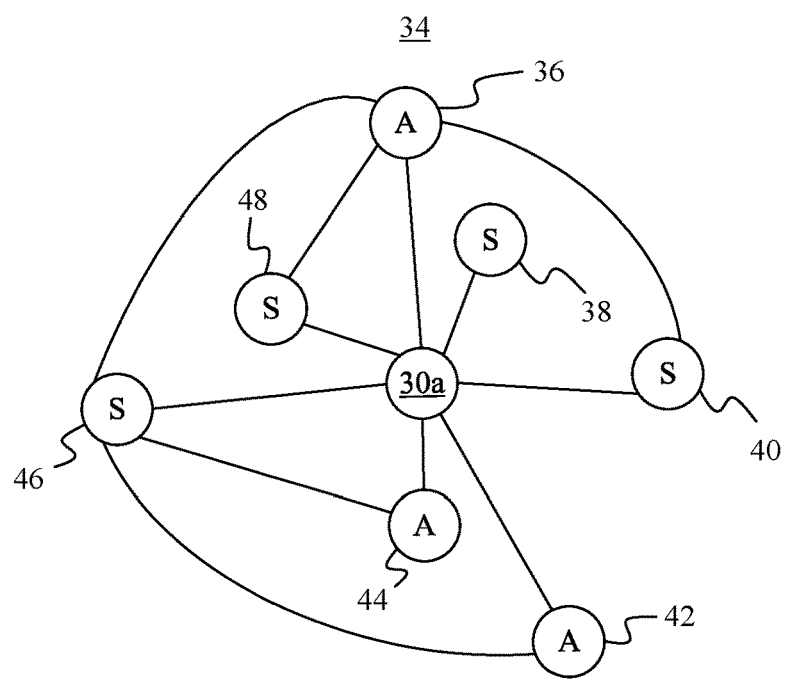
FIG. 3B is an illustration of an example of an access privilege graph according to an embodiment.

For example, FIG. 3B shows a graph 34 of the access privileges of the first trusted individual 30a relative to the components of a smart device system. In the illustrated example, the first trusted individual 30a has access to a first actuator 36 ("A", e.g., in an appliance), a first sensor 38 ("S", e.g., ambient light detector), a second sensor 40 (e.g., motion sensor), a second actuator 42 (e.g., door lock), a third actuator 44 (e.g., in a thermostat), a third sensor 46 (e.g., in a thermostat) and a fourth sensor 48 (e.g., in an appliance). Some of the illustrated components of the smart device system are also able to communicate with one another. The access privilege graph 34 may be incorporated into the trust network along with a relationship graph such as, for example, the graph 28 (FIG. 3A), already discussed. In an embodiment, the graph 34 and the graph 28 (FIG. 3A) are implemented in a non-relational database and/or graph database such as, for example, a NEO4J database.

Figure 4:
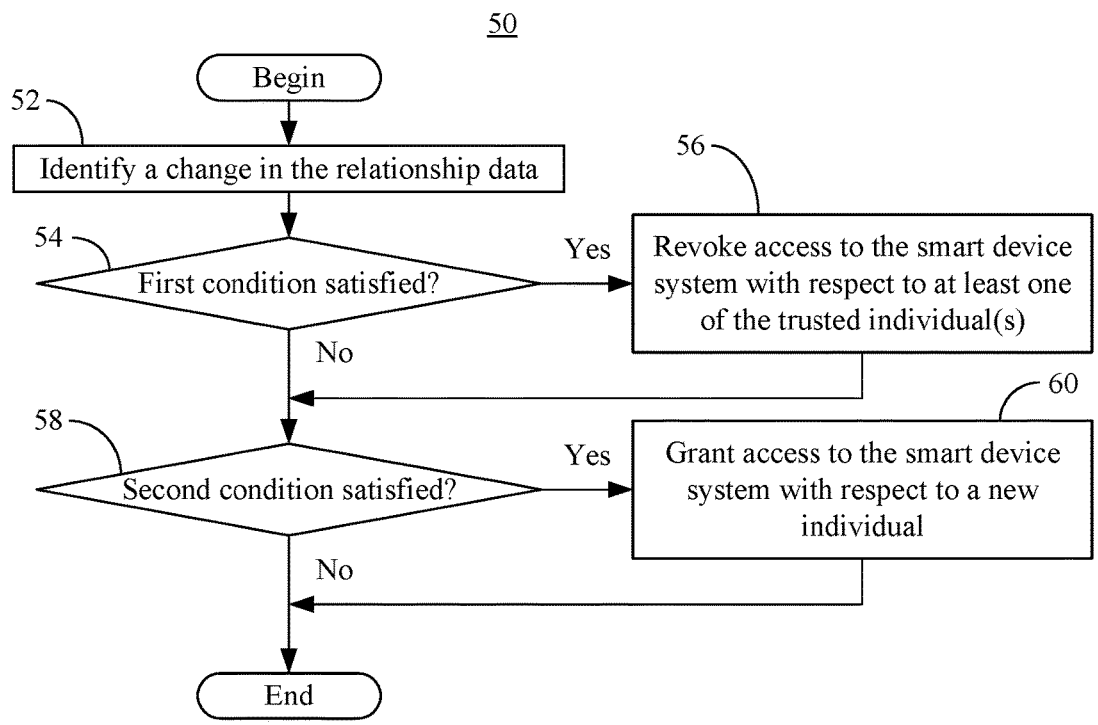
FIG. 4 is a flowchart of an example of a method of automatically responding to relationship data changes according to an embodiment.

Turning now to FIG. 4, a method 50 of automatically responding to relationship changes is shown. In an embodiment, the method 50 is implemented in fixed-functionality hardware, configurable logic, logic instructions, etc., or any combination thereof. For example, the logic instructions might include assembler instructions, ISA instructions, machine instructions, machine dependent instructions, microcode, state-setting data, configuration data for integrated circuitry, state information that personalizes electronic circuitry and/or other structural components that are native to hardware (e.g., host processor, CPU, microcontroller, etc.).

Illustrated processing block 52 provides for identifying a change in relationship data such as, for example, the relationship data 14 (FIG. 1), already discussed. In an embodiment, the change is an event frequency change, a tonal change, a mood change, etc., or any combination thereof. In one example, a determination is made at block 54 as to whether a first condition is satisfied. In an embodiment, the first condition includes a trust score of at least one of the trusted individual(s) being below a first threshold (e.g., 10% confidence level). In such a case, the trust score of the at least one trusted individual(s) being, for example, 5% would satisfy the first condition.

In another embodiment, the first condition includes the trust score of at least one of the trusted individual(s) being above the first threshold and acceptance of a removal prompt. Thus, if the trust score is, for example, 15% (i.e., not below 10%, but below some intermediate level such as a 50% confidence level), a suggestion (e.g., removal prompt) may be made to remove the at least one trusted individual(s) from the trust network. In one example, the suggestion is presented to the primary user via a suitable user interface (e.g., text message, display, speaker). If the removal prompt is accepted, the first condition would be satisfied in this embodiment. Other scoring models may also be used.

If the first condition is satisfied, illustrated block 56 revokes access to the smart device system with respect to the at least one trusted individual(s). Block 56 may include partially reducing access privileges. In an embodiment, partially reducing access privileges is achieved by removing the at least one trusted individual(s) from the trust network and communicating the updated trust network to the smart device system. Block 56 may also include removing one or more accessible components from an access privilege graph such as, for example, the graph 34 (FIG. 3B), while leaving the at least one trusted individual(s) in a relationship graph such as, for example, the graph 28 (FIG. 3A).

A determination is also made at illustrated block 58 as to whether a second condition is satisfied. In one example, the second condition includes a trust score of a new individual being above a second threshold (e.g., 90% confidence level). In such a case, the trust score of the new individual being, for example, 95% would satisfy the second condition.

In another embodiment, the second condition includes the trust score of the new individual being below the second threshold and an acceptance of an addition prompt. Thus, if the trust score is, for example, 85% (i.e., not above 90%, but above some intermediate level such as a 50% confidence level), a suggestion (e.g., addition prompt) may be made to add the new individual to the trust network. In one example, the suggestion is presented to the primary user via a suitable user interface. If the addition prompt is accepted, the second condition is satisfied in this embodiment. Other scoring models may also be used.

If the second condition is satisfied, illustrated block 60 grants access from the smart device system with respect to the new individual. In one example, block 60 includes adding the new individual to the trust network and communicating the updated trust network to the smart device system. In an embodiment, the method 50 is continuously and/or periodically repeated to respond to relationship changes in real-time.

Figure 5:
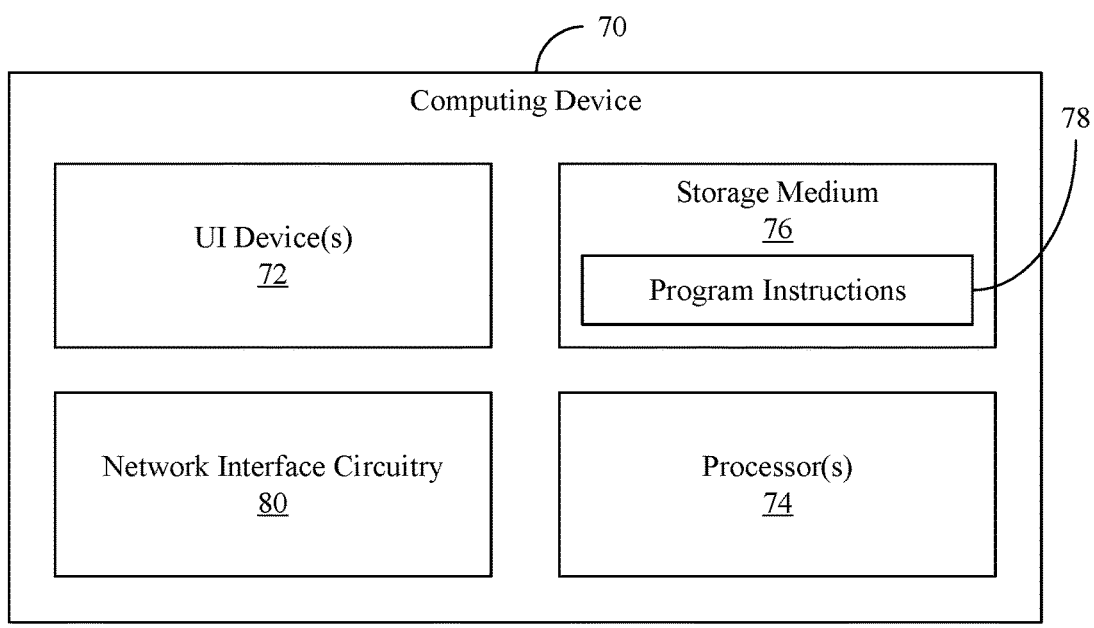
FIG. 5 is a block diagram of an example of a performance-enhanced computing device according to an embodiment.

FIG. 5 shows a computing device 70 that is used to manage access to smart device systems. The illustrated computing device 70, which may be centralized (e.g., client device, server) or distributed (e.g., data center, cloud computing infrastructure), includes one or more user interface (UI) devices 72 (e.g., keyboard, mouse, touch pad, touch screen, monitor, microphone, speaker) to facilitate interaction with a user of the computing device 70. One or more processors 74 are coupled to the illustrated UI device(s) 72 and a storage medium 76 (e.g., non-volatile memory, volatile memory, etc., or any combination thereof). In the illustrated example, the storage medium 76 includes program instructions 78 embodied therewith. In an embodiment, the program instructions 78 are executable by the processors 74 to cause the computing device 70 to perform one or more aspects of the method 18 (FIG. 2) and/or the method 50 (FIG. 4), already discussed.

Thus, execution of the program instructions 78 by the processor(s) 74 may cause the computing device 70 to extract relationship data from one or more social networks and generate a trust network based on the relationship data, wherein the trust network identifies one or more trusted individuals. In an embodiment, execution of the program instructions 78 by the processor(s) 74 causes the computing device 70 to grant access to the smart device system with respect to the one or more trusted individuals. In one example, the program instructions 78 are further executable to cause the computing device 70 to identify a change in the relationship data, revoke access to the smart device system with respect to at least one of the trusted individual(s) if the change satisfies a first condition, and grant access to the smart device system with respect to a new individual if the change satisfies a second condition.

In an embodiment, extracting the relationship data includes conducting an automatic cognitive analysis (e.g., image recognition analysis, face recognition analysis, natural language analysis, etc.) of one or more media feeds associated with the social network(s) and determining the relationship data based on the automatic cognitive analysis. In one example, the media feed(s) are received via network interface circuitry 80 (e.g., wireless, wired). The trust network may include a graph of relationships between the one or more trusted individuals and a primary user, a graph of access privileges, etc., or any combination thereof.

Thus, when a trusted individual encounters a component of the smart device system, identification and authentication of the trusted individual can be successfully completed. For example, when attempting to remotely activate a smart appliance or smart light, the trusted individual will be recognized as a registered user and given the opportunity to provide authentication input (e.g., user identification, password, multifactor authentication and/or other credentials).

Figure 6:
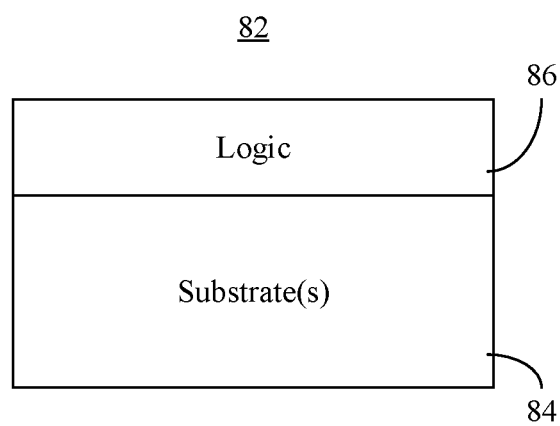
FIG. 6 is an illustration of an example of a semiconductor apparatus according to an embodiment.

Turning now to FIG. 6, a semiconductor package 82 (e.g., chip, die) that includes one or more substrates 84 (e.g., silicon, sapphire, gallium arsenide) and logic 86 (e.g., transistor array and other integrated circuit/IC components) coupled to the substrate(s) 84. The logic 86, which may be implemented at least partly in configurable logic and/or fixed-functionality hardware logic, may generally implement one or more aspects of the method 18 (FIG. 2) and/or the method 50 (FIG. 4), already discussed.

In an embodiment, the logic 86 extracts relationship data from one or more social networks and generates a trust network based on the relationship data, wherein the trust network identifies one or more trusted individuals. Additionally, the logic 86 grants access to the smart device system with respect to the one or more trusted individuals. In one example, logic 86 identifies a change in the relationship data, revokes access to the smart device system with respect to at least one of the trusted individual(s) if the change satisfies a first condition, and grants access to the smart device system with respect to a new individual if the change satisfies a second condition.

In an embodiment, extracting the relationship data includes conducting an automatic cognitive analysis (e.g., image recognition analysis, face recognition analysis, natural language analysis, etc.) of one or more media feeds associated with the social network(s) and determining the relationship data based on the automatic cognitive analysis. In one example, the trust network includes a graph of relationships between the one or more trusted individuals and a primary user, a graph of access privileges, etc., or any combination thereof.

Technology described herein therefore provides a solution to improve the user experience and efficiency during the on-boarding of users into a secured, trusted network for IoT device resource protection. In an embodiment, the technology builds a graph of users to establish relationships between them using a cognitive engine that analyzes social media feeds. As a result, users may be easily added to the trusted network of a smart system. The owner/main user may also have the capability to decide if access is to be automatically granted or subject to pre-approval.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A computing device comprising:
network interface circuitry to receive one or more media feeds associated with one or more social networks;
one or more processors; and
a computer readable storage medium having program instructions embodied therewith, the program instructions executable by the one or more processors to cause the computing device to:
conduct an automatic cognitive analysis of the one or more media feeds, wherein the automatic cognitive analysis identifies connected individuals that interact with a primary user through the one or more social networks,
determine relationship data based on the automatic cognitive analysis through an identification of a trust score for each respective connected individual of the connected individuals, wherein each trust score is based on interactions between the respective connected individual and the primary user through the one or more social networks, wherein the relationship data includes the trust scores,
generate a trust network based on the trust scores of the relationship data, wherein the trust network identifies one or more trusted individuals from the connected individuals,
grant access to a smart device system with respect to the one or more trusted individuals,
identify a change in the relationship data,
revoke access to the smart device system with respect to at least one of the one or more trusted individuals if the change satisfies a first condition, and
grant access, based on the trust network, to the smart device system with respect to a new individual if the change satisfies a second condition.

2. The computing device of claim 1, wherein the first condition includes either a first trust score of the one or more trust scores of the at least one of the one or more trusted individuals being below a first threshold or the first trust score of the at least one of the one or more trusted individuals being above the first threshold and an acceptance of a removal prompt.

3. The computing device of claim 1, wherein the second condition includes either a trust score of the new individual being above a second threshold or the trust score of the new individual being below the second threshold and an acceptance of an addition prompt.

4. The computing device of claim 1, wherein the change is selected from the group consisting of an event frequency change of interactions through the one or more social networks between one or more of the connected individuals and the primary user, a tonal change of interactions through the one or more social networks between one or more of the connected individuals and the primary user and a mood change of interactions through the one or more social networks between one or more of the connected individuals and the primary user.

5. The computing device of claim 1, wherein the automatic cognitive analysis is selected from the group consisting of image recognition analysis, face recognition analysis and natural language analysis.

6. The computing device of claim 1, wherein the trust network includes:
a first graph of interpersonal relationships between the one or more trusted individuals and the primary user, wherein each edge of the first graph is assigned one of the trust scores; and
a second graph of permission relationships between a first trusted individual of the one or more trusted individuals, wherein the second graph reflects access privileges of the first trusted individual relative to components of the smart device system.

7. A method comprising:
conducting an automatic cognitive analysis of one or more media feeds associated with one or more social networks, wherein the automatic cognitive analysis identifies connected individuals that interact with a primary user through the one or more social networks;
determining relationship data based on the automatic cognitive analysis through an identification of a trust score for each respective connected individual of the connected individuals, wherein each trust score is based on interactions between the respective connected individual and the primary user through the one or more social networks, wherein the relationship data includes the trust scores;
generating a trust network based on the trust scores of the relationship data, wherein the trust network identifies one or more trusted individuals from the connected individuals and includes one or more graphs;
granting access, based on the trust network, to a smart device system with respect to the one or more trusted individuals;
identifying a change in the relationship data;
revoking access to the smart device system with respect to at least one of the one or more trusted individuals if the change satisfies a first condition; and
granting access to the smart device system with respect to a new individual if the change satisfies a second condition.

8. The method of claim 7, wherein the first condition includes either a first trust score of the one or more trust scores of the at least one of the one or more trusted individuals being below a first threshold or the first trust score of the at least one of the one or more trusted individuals being above the first threshold and an acceptance of a removal prompt.

9. The method of claim 7, wherein the second condition includes either a trust score of the new individual being above a second threshold or the trust score of the new individual being below the second threshold and an acceptance of an addition prompt.

10. The method of claim 7, wherein the automatic cognitive analysis is selected from the group consisting of image recognition analysis, face recognition analysis and natural language analysis, and wherein the change is selected from the group consisting of an event frequency change of interactions through the one or more social networks between one or more of the connected individuals and the primary user, a tonal change of interactions through the one or more social networks between one or more of the connected individuals and the primary user and a mood change of interactions through the one or more social networks between one or more of the connected individuals and the primary user.

11. A computer program product to manage access to a smart device system, the computer program product comprising a computer readable storage medium having program instructions embodied therewith, the program instructions executable by a computing device to cause the computing device to:
conduct an automatic cognitive analysis of one or more media feeds associated with one or more social networks, wherein the automatic cognitive analysis identifies connected individuals that interact with a primary user through the one or more social networks;
determine relationship data based on the automatic cognitive analysis through an identification of a trust score for each respective connected individual of the connected individuals, wherein each trust score is based on interactions between the respective connected individual and the primary user through the one or more social networks, wherein the relationship data includes the trust scores;
generate a trust network based on the trust scores of the relationship data, wherein the trust network identifies one or more trusted individuals from the connected individuals; and
grant access, based on the trust network, to the smart device system with respect to the one or more trusted individuals.

12. The computer program product of claim 11, wherein the program instructions are executable to cause the computing device to:
identify a change in the relationship data;
revoke access to the smart device system with respect to at least one of the one or more trusted individuals if the change satisfies a first condition; and
grant access to the smart device system with respect to a new individual if the change satisfies a second condition.

13. The computer program product of claim 12, wherein the first condition includes a first trust score of the one or more trust scores of the at least one of the one or more trusted individuals being below a first threshold.

14. The computer program product of claim 12, wherein the first condition includes a first trust score of the one or more trust scores of the at least one of the one or more trusted individuals being above a first threshold and an acceptance of a removal prompt.

15. The computer program product of claim 12, wherein the second condition includes a trust score of the new individual being above a second threshold.

16. The computer program product of claim 12, wherein the second condition includes a trust score of the new individual being below a second threshold and an acceptance of an addition prompt.

17. The computer program product of claim 12, wherein the change is selected from the group consisting of an event frequency change of interactions through the one or more social networks between one or more of the connected individuals and the primary user, a tonal change of interactions through the one or more social networks between one or more of the connected individuals and the primary user and a mood change of interactions through the one or more social networks between one or more of the connected individuals and the primary user.

18. The computer program product of claim 11, wherein the automatic cognitive analysis is selected from the group consisting of image recognition analysis, face recognition analysis and natural language analysis.

19. The computer program product of claim 11, wherein the trust network includes:
- a first graph of interpersonal relationships between the one or more trusted individuals and the primary user, wherein each edge of the first graph is assigned one of the trust scores; and
- a second graph of permission relationships between a first trusted individual of the one or more trusted individuals, wherein the second graph reflects access privileges of the first trusted individual relative to components of the smart device system.

\* \* \* \* \*